US012438329B2

(12) United States Patent
Carlson et al.

(10) Patent No.: US 12,438,329 B2
(45) Date of Patent: Oct. 7, 2025

(54) METHODS OF GENERATING LASER OUTPUTS BASED ON DIFFERENT STATES OF LASER INPUTS AND RELATED SYSTEMS

(71) Applicant: The Government of the United States of America, as represented by the Secretary of the Navy, Arlington, VA (US)

(72) Inventors: Augustus X. Carlson, Bel Air, MD (US); Rafael R. Gattass, Washington, DC (US); Leslie Brandon Shaw, Woodbridge, VA (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/800,413

(22) Filed: Aug. 12, 2024

(65) Prior Publication Data

US 2025/0062584 A1 Feb. 20, 2025

Related U.S. Application Data

(60) Provisional application No. 63/532,996, filed on Aug. 16, 2023.

(51) Int. Cl.
*H01S 3/00* (2006.01)
*G02F 1/35* (2006.01)
(Continued)

(52) U.S. Cl.
CPC .......... *H01S 3/0092* (2013.01); *G02F 1/3534* (2013.01); *H01S 3/06716* (2013.01); *H01S 3/1608* (2013.01); *H01S 3/1618* (2013.01)

(58) Field of Classification Search
CPC .. H01S 3/0092; H01S 3/06716; H01S 3/1608; H01S 3/1618; G02F 1/3534
See application file for complete search history.

(56) References Cited

U.S. PATENT DOCUMENTS 7,599,408 B2 * 10/2009 Vachss .................. H01S 3/2383
372/20
8,611,759 B1 * 12/2013 Kvavle ............... H04J 14/0305
398/115

(Continued)

FOREIGN PATENT DOCUMENTS

| CN | 101272029 A | 9/2008 |
| JP | 2006-251360 A | 9/2006 |
| JP | 2007-323021 A | 12/2007 |

OTHER PUBLICATIONS

Written Opinion of the International Searching Authority, International Application No. PCT/US2024/042380, 3 pages, Mailed May 14, 2025.

(Continued)

*Primary Examiner* — Rhonda S Peace
(74) *Attorney, Agent, or Firm* — US Naval Research Laboratory; Scott C. Hatfield

(57) ABSTRACT

Methods and systems providing laser outputs are disclosed. A first laser input from a first pump laser source has a first average power, and a second laser input from a second pump laser source has a second average power. A first laser output is generated based on conversion of the first laser input and the second laser input at the first state. After generating the first laser output, the second laser input is provided at a second state with the second average power remaining unchanged. After generating the first laser output, a second laser output is generated based on conversion of the first laser input and the second laser input at the second state. Combined powers of the first laser input and the second laser (Continued)

input remain the same when generating the first and second laser outputs, but powers of the first and second laser outputs are different.

22 Claims, 10 Drawing Sheets

(51) Int. Cl.
   *H01S 3/067* (2006.01)
   *H01S 3/16* (2006.01)

(56) References Cited

U.S. PATENT DOCUMENTS

| | | | |
|---|---|---|---|
| 2011/0242645 A1 | 10/2011 | Sacks | |
| 2012/0195333 A1* | 8/2012 | Huang | H01S 3/0092 372/21 |
| 2014/0347719 A1 | 11/2014 | Villeneuve | |
| 2019/0155126 A1* | 5/2019 | Pomeranz | H01S 3/2391 |
| 2020/0259305 A1* | 8/2020 | Piccoli | H01S 3/0057 |
| 2021/0091527 A1* | 3/2021 | Gottschall | H01S 3/1106 |
| 2025/0062584 A1* | 2/2025 | Carlson | H01S 3/1618 |

OTHER PUBLICATIONS

International Search Report, International Application No. PCT/US2024/042380, 3 pages, Mailed May 14, 2025.

Thor Labs, "Periodically Poled Lithium Niobate (PPLN)—Tutorial," https://www.thorlabs.com/catalogpages/693.pdf, 5 pages, downloaded Jun. 20, 2023.

Carlson, Augustus X., et al., "Dual Fiber Laser Pumped Tunable Mid-Infrared Laser Source With High Speed Modulation," Proceedings of the SPIE (US), vol. 12882, id. 1288206, pp. 1-11, Mar. 2024.

Ren, T., et al., "Development Progress of 3-5 μm Mid-Infrared Lasers: OPO, Solid-State and Fiber Laser," Appl. Sci. (CH), 11(23) 11451, pp. 1-22, Dec. 2021.

Mao, Q. H., et al., "Widely Tunable Continuous Wave Mid-IR DFG Source Based on Fiber Lasers and Amplifiers," Laser Phys. Lett. (UK), vol. 6, No. 9, pp. 647-652, May 2009.

Zhao, J., et al., "Continuous-Wave 3.1-3.6 μm Difference-Frequency Generation of Dual Wavelength-Tunable Fiber Sources in PPMgLN-Based Rapid-Tuning Design," IEEE Journal of Selected Topics in Quantum Electronics (US), vol. 24, No. 3, 3100208, 9 pages, May/Jun. 2018.

Guha, S., et al., "Multiwatt-Level Continuous-Wave Midwave Infrared Generation Using Difference Frequency Mixing in Periodically pPoled MgO-Doped Lithium Niobate," Optics Letters (US), vol. 39, No. 17, pp. 5018-5021, Sep. 2014.

Murray, R. T., et al., "High Average Power Parametric Wavelength Conversion at 3.31-3.48 μm in MgO:PPLN," Optics Express (US), vol. 25, Issue 6, pp. 6421-6430, Mar. 2017.

Taylor, J. R., "Fiber Laser Driven Three-Micron Source Development Based on Difference Frequency Generation," Optoelectron. Instrument. Proc. (US), vol. 59, Issue 1, pp. 18-27, Jun. 2023.

* cited by examiner

METHODS OF GENERATING LASER OUTPUTS BASED ON DIFFERENT STATES OF LASER INPUTS AND RELATED SYSTEMS

CROSS REFERENCE TO RELATED APPLICATION

This Application is a Nonprovisional Utility Patent Application and claims the benefit of priority under 35 U.S.C. Sec. 119 based on U.S. Provisional Patent Application No. 63/532,996 filed on Aug. 16, 2023. The disclosure of Provisional Application No. 63/532,996 and all references cited herein are hereby incorporated in their entirety by reference into the present disclosure.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; nrltechtran@us.navy.mil, referencing Navy Case #211631-US2.

TECHNICAL FIELD

The present disclosure relates to methods of generating laser outputs based on conversion of laser inputs and related systems.

BACKGROUND

The mid-infrared wavelength range is defined herein as a wavelength range spanning from about 2000 nm to about 5000 nm. Materials capable of active gain can be rare-earth (or transition metal) doped transparent materials and/or electrically driven laser-diodes. Examples of these systems include direct electrical optical conversion in quantum cascade lasers (QCLs), intracavity lasers (ICLs), and optically active gain in rare-earth doped materials such as fluoride doped fibers and transition metal ion doped crystals. However, the emission bandwidth of laser diodes may be limited by the design and gain of the material, and may typically have narrow emission bandwidths for a given diode design (e.g., less than about 200 nm). Spontaneous emission occurring from the optical gain of rare-earth ion doped materials can emit over multiple wavelengths, while remaining limited within the 2800 nm to 4200 nm wavelength range depending on the excitation wavelength and the rare-earth ion used. Transition metal ions containing materials such as Cr doped ZnSe and Fe doped ZnSe and ZnS may have wide emissions but may suffer power penalties in the 3000 nm to 3600 nm wavelength range.

Nonlinear optical conversion may provide a way to convert efficient high power laser systems from other wavelength ranges such as the short wave infrared and near infrared into the mid-infrared range. Indeed several demonstrations and commercial systems exist based on frequency conversion of lasers into this range. Among the various sources used, laser emission from Ytterbium and Erbium ions doped in a silica matrix with optical emissions around 1 μm and 1.55 μm, respectively are commonly used. In an all-fiber configuration, Ytterbium doped fiber lasers are understood to operate efficiently with wavelength emissions in a range from about 1020 nm to about 1150 nm. Erbium doped fiber lasers are understood to operate efficiently with wavelength emissions in a range from about 1530 nm to 1610 nm.

Known devices, however, may work over relatively narrow wavelength bands, may be limited in an amount of power that can be handled, and/or may provide relatively slow power modulation.

SUMMARY

This summary is intended to introduce in simplified form, a selection of concepts that are further described in the Detailed Description. This summary is not intended to identify key or essential features of the disclosed subject matter, nor is it intended to be used as an aid in determining the scope of the disclosed subject matter. Instead, it is merely presented as a brief overview of subject matter described herein.

According to some embodiments of inventive concepts, a laser output is provided. A first laser input with a first average power is provided from a first pump laser source, and a second laser input at a first state with a second average power is provided from a second pump laser source. A first laser output is generated using a crystal to provide conversion of the first laser input with the first average power and the second laser input at the first state with the second average power using difference frequency generation (DFG). After generating the first laser output, the second laser input is provided at a second state with the second average power from the second pump laser source, wherein the first and second states of the second laser input are different, and wherein the second average power remains unchanged for the first and second states of the second laser input. Moreover, a combined power of the first laser input and the second laser input at the first state is the same as a combined power of the first laser input and the second laser input at the second state. After generating the first laser output, a second laser output is generated using the crystal to provide conversion of the first laser input with the first average power and the second laser input at the second state with the second average power using DFG, and powers of the of the first and second laser outputs are different.

According to some other embodiments of inventive concepts, a first laser input with a first average power is provided from a first pump laser source, and a second laser input at a first state with a second average power is provided from a second pump laser source. A first laser output is generated based on conversion of the first laser input with the first average power and the second laser input at the first state with the second average power. After generating the first laser output, the second pump laser source provides the second laser input at a second state with the second average power, with the first and second states being different. Moreover, the second average power remains unchanged for the first and second states of the second laser input, and a combined power of the first laser input and the second laser input at the first state is the same as a combined power of the first laser input and the second laser input at the second state. After generating the first laser output, a second laser output is generated based on conversion of the first laser input with the first average power and the second laser input at the second state with the second average power, and powers of the of the first and second laser outputs are different.

According to still other embodiments of inventive concepts, a system provides a laser output. The system includes first and second pump laser sources, a conversion material, and a controller coupled to the second pump laser source.

The first pump laser source is configured to generate a first laser input with a first average power, and the second pump laser source is configured to generate a second pump laser input with a second average power. The conversion material is configured to provide conversion of the first and second laser inputs. In particular, the controller is configured to control the second pump laser source to provide the second laser input at a first state with the second average power so that the conversion material provides conversion of the first laser input with the first average power and the second laser input at the first state with the second average power to generate a first laser output. The controller is further configured to control the second pump laser source to provide the second laser input at a second state with the second average power after providing the second laser input at the first state with the second average power so that the conversion material provides conversion of the first laser input with the first average power and the second laser input at the second state with the second average power to generate a second laser output. Moreover, the second average power remains unchanged for the first and second states of the second laser input. Moreover, a combined power of the first laser input and the second laser input at the first state is the same as a combined power of the first laser input and the second laser input at the second state, but powers of the first and second laser outputs are different.

BRIEF DESCRIPTION OF THE DRAWINGS

Examples of embodiments of inventive concepts may be more clearly understood from the following detailed description taken in conjunction with the accompanying drawings in which.

DETAILED DESCRIPTION

Figure 1A:
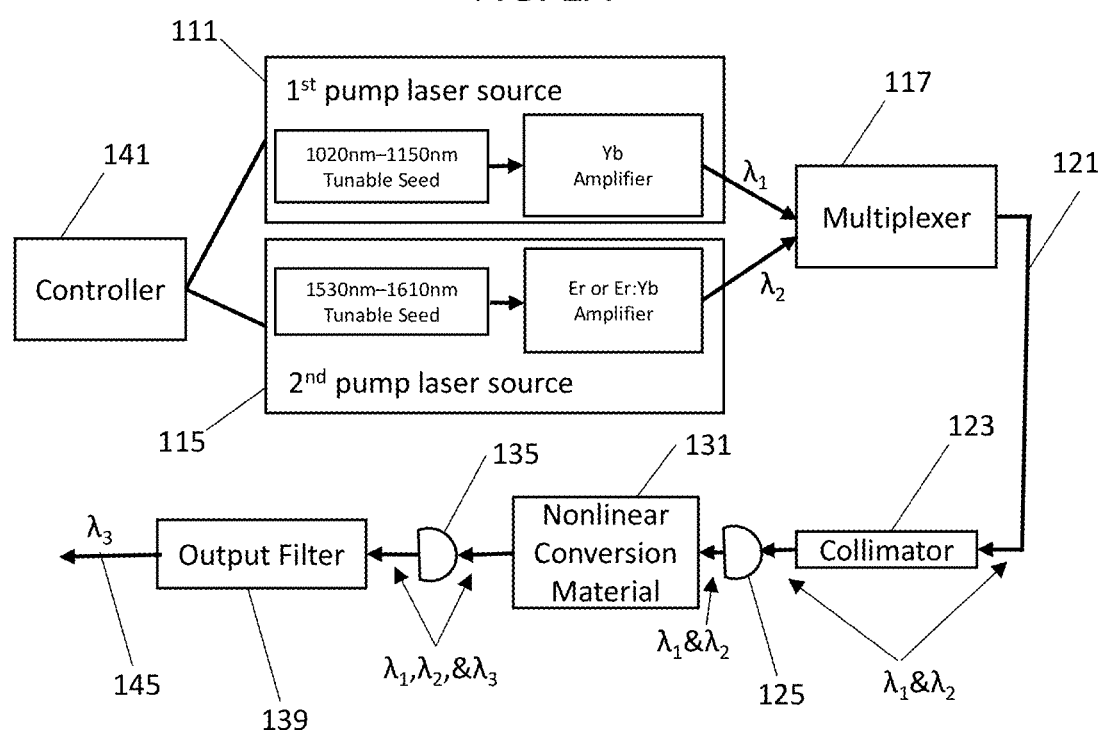
FIG. 1A is a block diagram illustrating a laser system including tunable fiber-based laser sources (e.g., pump and signal fiber-based laser sources) and DFG conversion according to some embodiments of inventive concepts.

Aspects and features of the present disclosure will now be described more fully with reference to the accompanying drawings. The following description shows, by way of example, combinations and configurations in which aspects, features, and embodiments of inventive concepts can be put into practice. It will be understood that the disclosed aspects, features, and/or embodiments are merely examples, and that one skilled in the art may use other aspects, features, and/or embodiments or make functional and/or structural modifications without departing from the scope of the present disclosure. Moreover, like reference numerals refer to like elements throughout.

The present disclosure describes systems and methods that may provide tunable light in the mid-infrared range from a fiber based light source. More specifically, systems and methods are disclosed that may provide watt-level average power sources with spectral emissions tunable in a range from about 2000 nm to about 5000 nm (e.g., about 2800 nm to about 4200 nm), with spectral linewidths of about 1 nm, and tunable within less than about 1 s (e.g., about 10 ms). According to other embodiments, systems may incorporate temporal modulation to the mid-infrared light with modulation rates up to 10 kHz and with extinction ratios on the order of 30 dB. In both optical systems, a spatial profile of the emitted light may be near single mode with $M^2$ less than about 1.5. According to other embodiments, systems may incorporate an output fiber to deliver infrared light. Applications of such sources may include material characterization, remote sensing, illumination, etc.

Conversion of light to the mid-infrared range from these sources may occur through difference frequency generation (DFG). In difference frequency generation, one pump laser source generates a shorter wavelength photon (also referred to as a first input/pump photon), another pump laser source (also referred to as a signal laser source) generates a longer wavelength photon (also referred to as a second pump photon or a signal photon), and outputs of these pump laser sources mix inside a nonlinear conversion material to generate a new output (also referred to as an idler) having a photon (also referred to as an idler photon) at a wavelength that is determined by a difference in energy between the input/pump photons from the pump laser sources. Stated in other words, the wavelength of the output of the nonlinear conversion material is a function of the wavelengths from the pump laser sources that are input to the nonlinear conversion material.

A typical configuration for DFG may use a single laser source (reducing costs) and a nonlinear conversion material (also referred to as a nonlinear conversion element) placed inside a resonant cavity. Light from the laser source propagates into a cavity containing the nonlinear material (e.g., a nonlinear crystal) and a series of mirrors. The mirrors reflect light from the single laser source within the cavity enhancing the power and increasing the conversion. This method may be effective for low peak power laser systems and continuous wave (CW) laser systems. However, the use of a resonant cavity may require high mechanical stability of the oscillator components to maintain efficient optical conversion. Alternatively, nonlinear conversion may occur in a single pass configuration where the shorter wavelength light (from pump/signal laser sources) propagates into the nonlinear conversion material and the converted light (idler) is generated as it propagates, without need for a resonant cavity. This alternate approach may be more mechanically stable than an oscillator, but may impose greater restrictions on the pump/signal light sources.

There are many materials that may be used for nonlinear conversion including nonlinear crystals such as Beta Barium Borate (BBO), Potassium Titanyl Phosphate (KTP), Lithium Triborate (LBO), and Lithium Niobate. Periodically poled crystals can display higher nonlinear effective gain than other crystals, since the nonlinearity can effectively occur over longer lengths (typically in the range of about 10 mm to about 50 mm). In particular, periodically poled Lithium Niobate PPLN (and its variant periodically poled Lithium Tantalate) crystals may be excellent alternatives for generation of wavelengths below 4200 nm as the material starts to display significant absorption beyond 4200 nm and conversion may be severely affected.

Nonlinear conversion in PPLN may be highly dependent on the polarization of the laser systems used. A PPLN crystal may be birefringent, and the magnitude of the nonlinearity may depend on the orientation of the input light with respect to the crystal. For the particular case of difference frequency generation, the input of both light sources may need to be controlled to provide/ensure proper conversion.

In difference frequency generation DFG, the wavelength of a generated output/idler light from the nonlinear conversion material is determined by mixing two wavelengths at the input to the nonlinear conversion material (e.g., from first and second pump laser sources, also referred to as pump and signal laser sources), and the conversion efficiency is determined by the nonlinear material properties. Efficient conversion of two input wavelengths may require the nonlinear crystal to be thermally stabilized at its phase matching temperature. In the case of periodically poled crystals, this temperature is a function of the poling period of the crystal as well as the wavelengths of light generated by the first and second pump laser sources. For example, single pass conversion with a first pump laser source providing 1064 nm wavelength light and a second pump laser source providing 1550 nm wavelength light may generate 3393 nm output/idler light, but it may only do so efficiently in a PPLN crystal with about a 30.49 μm poling period at a temperature of about 61.8° C. This same conversion process may be possible in PPLN with different poling periods, but may require different crystal temperatures. Therefore, controlling the temperature of the crystal, controlling the poling period, and controlling the input wavelengths are important for efficient conversion. An example of a DFG oscillator may involve a pump laser source providing 1064 nm wavelength light as an input into a resonant cavity. The mirrors in the cavity may allow resonance of a wide range of wavelengths around the 1550 nm range, and the output idler wavelength may be determined by the PPLN period used and the temperature. This conversion method may allow tunability of the output color, but it may require the mechanical movement of the crystal (to move the overlapped beams in the cavity over a different periodically poled period) and/or temperature control of the crystal, depending on the wavelength range of interest.

Two factors that may limit the output power scalability of DFG systems are the damage threshold and thermal stability of the nonlinear conversion crystal being used. The damage threshold of a nonlinear conversion crystal may be dependent on the wavelength of the input light as well as whether the source is continuous wave (CW) or pulsed. The generation of shorter wavelength light, particularly in the visible range, may significantly reduce the damage threshold and may result in damage to the crystal. For CW sources, the damage threshold may depend on the intensity of the light incident on the crystal, which is a combination of the laser power and the beam diameter. For pulsed laser sources, the peak power, pulse duration, repetition rate, and beam size may all effect the crystal damage threshold.

While the damage threshold may limit the amount of input optical power that can be used, the thermal stability of the crystal directly effects the efficiency of the nonlinear process. In the example of a single-pass DFG setup using PPLN as a nonlinear conversion crystal, the required phase matching temperature (PMT) of the PPLN crystal may be determined by the input pump and signal wavelengths and the crystal period. The acceptable temperature bandwidth around the PMT to maintain efficient conversion may be on the order of about 1° C. to about 2° C. for PPLN. In order to meet this condition, the nonlinear conversion crystal may be mounted in a temperature controlled oven and adjusted to a temperature in the range of about 20° C. to about 200° C. While the overall temperature of the nonlinear conversion crystal oven can be controlled very precisely, the nonlinear conversion crystal may develop internal temperature gradients due to the low thermal conductivity of the crystal (about 5W/m-K for PPLN), which may limit the ability of the oven to maintain an even temperature across the crystal. These internal gradients can be induced by waste heat from the laser sources, and may be an issue in high-power CW systems. Uneven crystal heating may result in a drop in conversion efficiency, reducing output power, and creating cyclic fluctuations in power.

The ability to temporally modulate the intensity of a laser source may be a requirement for numerous applications. When modulating a laser source, the maximum extinction ratio and maximum modulation rate may both be important parameters. Multiple different modulation techniques and/or devices can be used, such as, direct drive modulation of laser pump diodes, electro-optic (EO) and/or acousto-optic (AO) modulators, and/or microelectromechanical systems based (MEMS-based) modulators, to name a few. In the case of direct drive modulation of a fiber laser, the current driven through the pump diodes is modulated in order to modulate the output power of the laser cavity. This technique may suffer from several drawbacks such as limited extinction ratio due to instability near threshold, and/or limits on possible modulation frequencies. Modulator devices such as EOs, AOs, and MEMS modulators work by diverting part of a laser's output power so that the amount of light transmitted through the modulator can be changed. The design of electro-optic and acousto-optic modulators may inherently work over a narrow wavelength band, limiting their use in devices which are widely tunable. MEMS-based devices vary the light coupled between an input and output optical fiber. Such MEMS-based devices may operate over a wide wavelength band, but may be limited in the amount of power they can handle.

The DFG process may offer additional opportunities for modulation due to its reliance on mixing two input/pump photons to generate an output/idler photon. If only one input photon is present or if one of the input photons has the wrong polarization, then the DFG process may not occur. This raises the possibility of modulation through three approaches: control over the input light polarization, temporal offset of the input photons, and spectral tuning. Control of the input light polarization may require the insertion of a polarization controller into one of the input light sources. This method may be limited by both the speed and the power limit of the polarization controller. Controlling the temporal offset between input signal and pump photons may require the use of pulsed light sources, in which both the signal and pump pulses may need to overlap temporally and spatially to provide conversion. By temporally walking one of the input pulses off of the other, the difference frequency conversion may be reduced/eliminated without needing to alter the power levels of the light sources used as inputs. Benefits of this pulse walk-off modulation may include the high speed at which it can be performed (limited only by the speed of the pulse delay control circuitry) and/or the constant input power levels which reduce/prevent cyclic heating in the nonlinear conversion crystal.

Extinction ratio is defined as a ratio between a minimum measurable output power of a system and a maximum output power of a laser system. For example, if a laser system can output a maximum of 1 W at its highest power setting and a minimum of 10 mW at its lowest output setting, then the extinction ratio is 100, or in decibels as defined by $10*Log_{10}$ (Pmax/Pmin), it would amount to 20 dB.

A quality of the spatial mode of a laser beam can be characterized using the $M^2$ number. The $M^2$ number is defined in ISO Standard 11146, and is related to the ability to focus a laser beam to a diffraction limited spot. For the case of a pure Gaussian laser beam, $M^2=1$ and the laser beam can be focused to a diffraction limited spot. $M^2$ numbers above 1 indicate that the laser beam dimensions at the focus will exceed the diffraction limit by $M^2$.

A silica based optical fiber may typically include a core region and a clad region (also referred to as a cladding region), with each region being characterized by a respective refractive index. Typically, the refractive index of the core region is greater than the refractive index of the clad region. Other fiber architectures may be known to those knowledgeable in the art such as multiple cladding optical fibers (double clad fibers are one such example), photonic crystal fibers, and depressed cladding fibers.

FIG. 1A is a schematic diagram of a mid-infrared laser source according to some embodiments of inventive concepts. The system of FIG. 1A may include two high-speed tunable fiber-based laser sources 111 and 115, each of which may be modulated to control an output thereof over the indicated range of wavelengths responsive to controller 141. The system of FIG. 1A may also include multiplexer 117 (e.g., a polarization maintaining wavelength combiner), polarization maintaining optical fiber 121, collimator 123 (e.g., an F260APC-1550 collimator with f=15.58 mm), lens 125 (e.g., an AC254-150-C Achromat lens with f=150 mm), nonlinear conversion material 131 (e.g., a nonlinear conversion crystal such as a PPLN conversion crystal, also referred to as PPLN) with temperature control, lens 135 (e.g., an LA5817 $CaF_2$ Plano-convex Lens), and output filter 139.

Fiber-based pump laser source 111 (also referred to as a first pump laser source) may emit light with a wavelength 2 that is tunable over a range of about 1020 nm to about 1150 nm (and more particularly over a range of about 1053 nm to about 1068 nm) responsive to controller 141, and fiber-based pump laser source 115 (also referred to as a second pump laser source or a signal laser source) may emit light with a wavelength 22 that is tunable over a range of about 1530 nm to about 1610 nm (and more particularly over a range of about 1530 to about 1570 or over a range of 1584 nm to about 1610 nm) responsive to controller 141. As shown, each pump laser source 111 and 115 may include a tunable seed and an amplifier. Moreover, controller 141 may control a state (also referred to as a modulation) of one or both of pump laser sources 111 and/or 115. For example, controller 141 may control a variable wavelength of one or both of laser sources 111 and/or 115; controller 141 may control a polarization of a laser output(s) of one or both of laser sources 111 and/or 115; and/or controller 141 may control a pulse frequency, pulse width, and/or pulse delay of one or both of laser sources 111 and/or 115.

The wavelength emitted by each pump laser source 111 and 115 (i.e., 21 and 22) is tunable, with an emission bandwidth between about 0.001 nm and about 1 nm. The average power of each pump laser source may be in the range of 1 W to 100 W, and more particularly in the range of about 10 W. A spatial profile of each pump laser source may be characterized to have an $M^2$ value in the range of about 1.0 to about 2.0, and more particularly with $M^2<1.2$. Laser beams of both pump laser sources 111 and 115 are spatially combined by multiplexer 117 and may propagate through optical fiber 121, collimator 123, lens 125, and nonlinear conversion material 131. Nonlinear conversion material 131 nonlinearly converts laser light from the two pump laser sources 111 and 115 using Difference Frequency Generation (DFG). After the light propagates through nonlinear conversion material 131, original light from pump laser sources 111 and 115 having wavelengths $\lambda_1$ and $\lambda_2$ may be filtered by output filter 139, and the converted midinfrared light having wavelength $\lambda_3$ from nonlinear conversion material 131 propagates through output filter 139 and out of the system.

The fiber-based pump laser sources 111 and 115 may provide continuous wave emission or pulsed emission. In the case of pulsed emission, both pump laser sources 111 and 115 may be externally triggered by controller 141 where the repetition rate of laser pulses may be in a range between about 100 kHz and about 100 MHz, and in some embodiments between about 500 kHz and about 10 MHz. The pulse duration may be in a range between about 100 ps and about 100 ns, and more typically between about 1 ns and about 5 ns. In the case of pulsed emission, the laser sources 111 and 115 may overlap temporally in addition to overlapping spatially in/at the nonlinear conversion material 131. With pulsed emission, the converted mid-infrared light having wavelength $\lambda_3$ may be generated in pulses during periods of time when pulses from the pump laser sources 111 and 115 overlap temporally.

The nonlinear conversion material 131 may be a nonlinear crystal material (also referred to as a nonlinear crystal or a crystal) such as a periodically poled crystal (e.g., PPLN) which may provide relatively efficient conversion of both continuous wave CW and pulsed pump laser sources at the powers and peak powers used. A length of PPLN used as the nonlinear conversion material 131 may be in the range of about 10 mm to about 60 mm, and more particularly in the range of about 30 mm to about 50 mm. The conversion efficiency may be dependent on the length of the PPLN used as the nonlinear conversion material 131, the laser linewidth used, and/or the pulse duration. The PPLN used as the nonlinear conversion material 131 may have a thickness in a range between about 0.1 mm and about 3 mm, and more particularly about 1 mm. A 1 mm thickness of the PPLN may allow the laser beams from the pump laser sources 111 and 115 to be focused to about a 100 µm diameter inside the PPLN nonlinear conversion material 131 and to propagate with reduced clipping for the length of the PPLN nonlinear conversion material 131.

The PPLN nonlinear conversion material 131 may be kept at a relatively fixed temperature, for example, in a range from about 30° C. to about 200° C., and more particularly in a range of about 50° C. to about 150° C. The temperature of the PPLN nonlinear conversion material 131 may be kept relatively constant during operation. According to some embodiments of FIG. 1A, nonlinear conversion material 131 may be provided as a 50 mm PPLN crystal produced by HC Photonics (HCP), with a 30.49 µm period, a 102° C. phase matching temperature (PMT), 50% power overlap, and spot sizes of 1 µm for D~70 µm or 1.5 µm for D~120 µm.

Beam combination between the pump laser sources 111 and 115 can be performed using free space optical elements such as mirrors, filters and/or prisms. According to some embodiments of a mid-infrared laser, a fiber based component such as multiplexer 117 (e.g., a micro-optic fiber based multiplexer component) may be used to combine both beams of pump laser sources 111 and 115 into a single polarization maintaining (PM) optical fiber 121. The fiber-based pump laser sources 111 and 115 may be spliced to the fiber based multiplexer component to increase mechanical and/or thermal stability.

As discussed below, a modulator may be applied to one or both of the pump laser sources 111 and/or 115. Since difference frequency generation depends on the combined intensity of both beams, modulation of one of the pump laser sources may be enough to lead to modulation of the mid-infrared converted light. A modulator can be a fiber-based polarization control element where the polarization of the pump laser source can be modulated (e.g., rotated) with respect to a desired conversion polarization responsive to controller 141. For the case of conversion in a PPLN nonlinear crystal, polarizations of outputs from pump laser sources 111 and 115 may generate the most mid-infrared power if they are aligned with a dipole moment of crystal periods of the PPLN. In this scenario, a polarization modulator may rotate the polarization up to a full 90 degrees orthogonal to the original value to induce an increased/maximum modulation of the mid-infrared laser intensity. Alternative embodiments may use an intensity modulator to control a power output of one of the laser sources 111 and/or 115. Reduction of the power in one of the laser sources 111 and/or 115 may lead to reduction in a total power output. By modulating light output from one or both of laser sources 111 and/or 115 using polarization control while maintaining constant powers of the outputs of laser sources 111 and 115, the mid-infrared light output from nonlinear conversion material 131 may be modulated while a maintaining a constant thermal load on nonlinear conversion material 131. By maintaining the constant thermal load on nonlinear conversion material 131, wavelength stability of the mid-infrared light output from nonlinear conversion material can be improved.

Figure 1B:
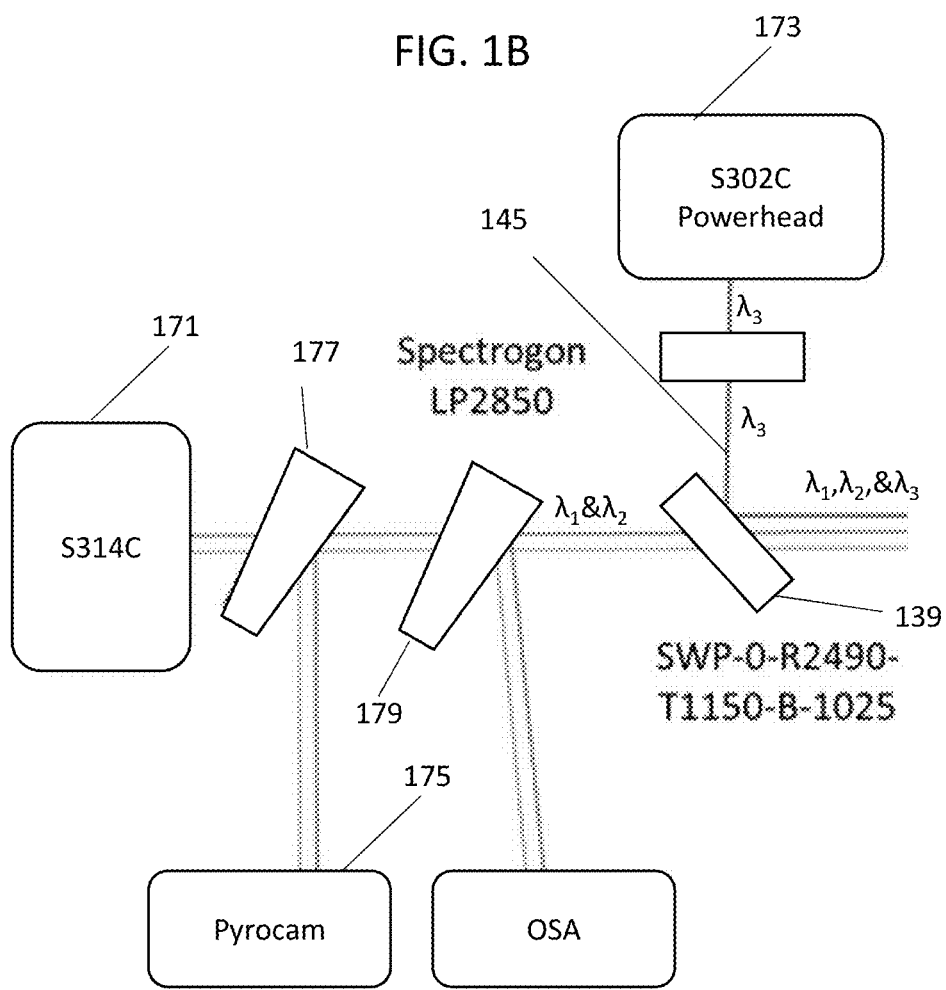
FIG. 1B is a schematic diagram illustrating additional components provided to process an output from nonlinear conversion material of FIG. 1A that may be provided according to some embodiments of inventive concepts.

FIG. 1B illustrates additional elements that may be included downstream from optical filter 139. As shown in FIG. 1B, output from nonlinear conversion material 131 may include light from pump laser sources 111 and 115 having input wavelengths 21 and 12 and light generated by nonlinear conversion material 131 having wavelength $\lambda_3$. Filter 139 may separate light having wavelength $\lambda_3$, and direct the light having wavelength $\lambda_3$ into optical fiber 145 for further processing. Filter 139 may also separate light having wavelengths $\lambda_1$ and $\lambda_2$ for further processing separate from light having wavelength $\lambda_3$.

Some embodiments of a first Example are discussed below.

According to some embodiments of FIG. 1A, a mid-infrared laser source may provide tunable emission of light with wavelength $\lambda_3$ over a range of about 2800 nm to about 4200 nm using nonlinear conversion of two tunable fiber-based pump laser sources 111 and 115 having respective wavelengths $\lambda_1$ and $\lambda_2$. Outputs of the two fiber-based pump laser sources 111 and 115 are spatially combined by multiplexer 117 so that their beams overlap inside nonlinear conversion material 131 (e.g., provided as a temperature controlled PPLN crystal). Fiber-based pump laser source 111 emits light having a wavelength $\lambda_1$ selected from a range of about 1020 nm to about 1150 nm, while the fiber-based pump laser source 115 emits light having a wavelength $\lambda_2$ selected from a range of about 1530 nm to about 1610 nm. The wavelength emitted by each pump laser source is tunable, with an emission bandwidth in a range between about 0.01 nm and about 1 nm. The combined beams from pump laser sources 111 and 115 propagate through the nonlinear conversion material 131 (provided as a PPLN crystal) and are filtered out by output filter 139 after exiting the nonlinear conversion material 131. The resulting mid-infrared beam having wavelength $\lambda_3$ propagates through output filter 139 and may be collimated out of the system. Amplitude control may be provided using a polarization controller in one or both of pump laser sources 111 and/or 115 to provide modulation responsive to controller 141. A polarization controller may allow the polarization of one or both of the pump lasers sources to be changed to any orientation including 90 degrees offset from the original polarization. The extinction ratio using polarization control can exceed 1000, allowing for 30 dB of extinction.

Some embodiments of a second Example are discussed below.

According to some embodiments of FIG. 1A, the system described in Example 1 may be provided such that pump laser source 111 is a tunable ytterbium fiber-based pump laser source with wavelength tuning in a range between about 1053 nm and about 1078 nm, and such that pump laser source 115 (also referred to as the signal laser source) is a tunable erbium fiber-based laser source with wavelength tuning in a range between about 1566 nm and about 1576 nm. The outputs of the two pump laser sources are spliced into multiplexer 117 (e.g., a polarization maintaining wavelength division multiplexer) to combine both wavelengths into a single polarization maintaining fiber 121 (e.g., Coherent PM980). The output of the fiber 121 is collimated by a fixed aspherical collimator 123 with focal length (f) of 15.5 mm, and focused into a the nonlinear conversion material 131 (e.g., provided as a PPLN crystal) using an achromatic lens 125 with focal length (f) of 150 mm. In such embodiments, nonlinear conversion material 131 may be provided as a PPLN crystal that is 50 mm long, poled at a 30.49 µm period, and kept at a fixed temperature of 102° C. Each pump laser source (e.g., pump laser source 111 and pump/signal laser source 115) may be tuned independently to provide/ensure that a desired/optimum wavelength for conversion may be obtained.

Figure 2:
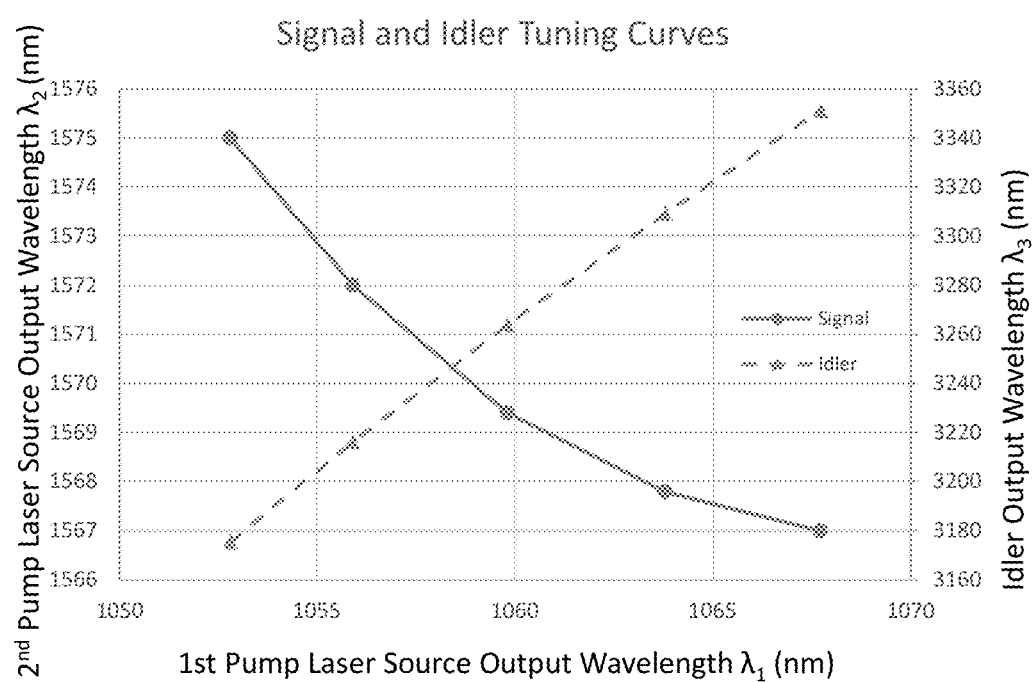
FIG. 2 is a graph illustrating example tuning ranges of laser sources of FIG. 1A according to some embodiments of inventive concepts.
Figure 3:
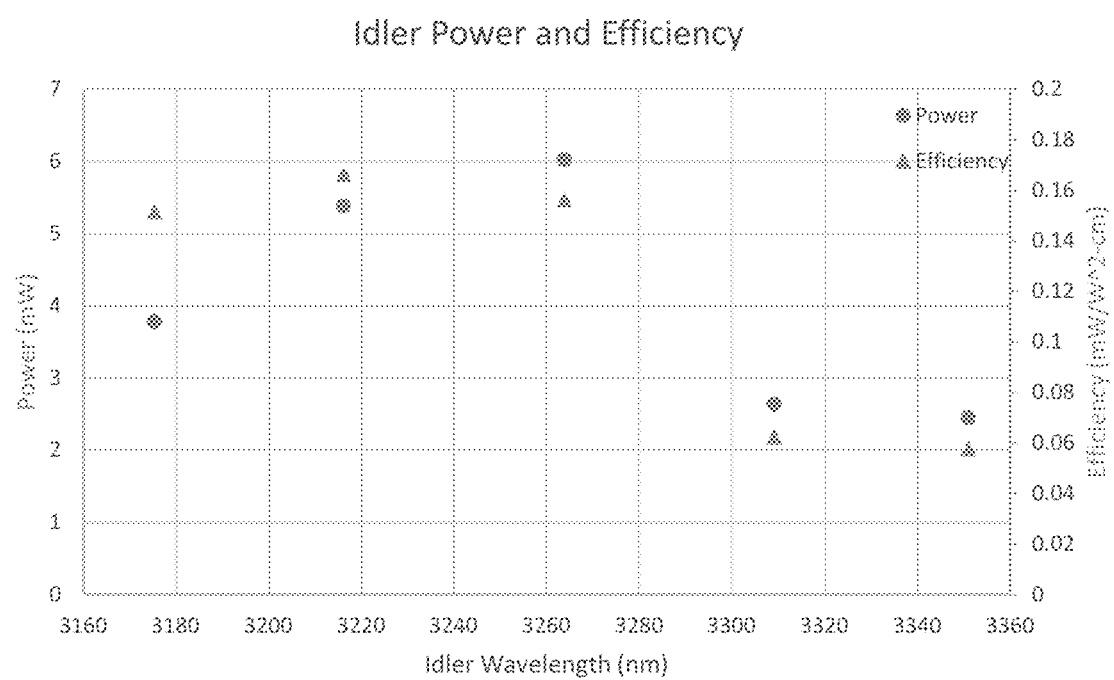
FIG. 3 is a graph illustrating examples of converted power and efficiency for two CW tunable laser sources coupled into a 50 mm PPLN crystal operated at 102° C. temperature with 30.49 μm period according to some embodiments of inventive concepts.

FIG. 2 is a graph illustrating examples of the generated converted power for a series of wavelength combinations shown in FIG. 3 for two laser sources (pump and signal laser sources indicated by the solid curve) operating over the Ytterbium and Erbium emission wavelengths in silica fiber. In FIG. 2, the emitted mid-infrared wavelength (idler indicated by the dashed line) is listed on the right axis for each value matching the pump and signal laser sources shown in the solid curve. As shown in FIG. 2, idler power may vary from 2.5 mW to 6 mW and may be achieved with 30.49 µm period PPLN at 102 degrees C.

Figure 4:
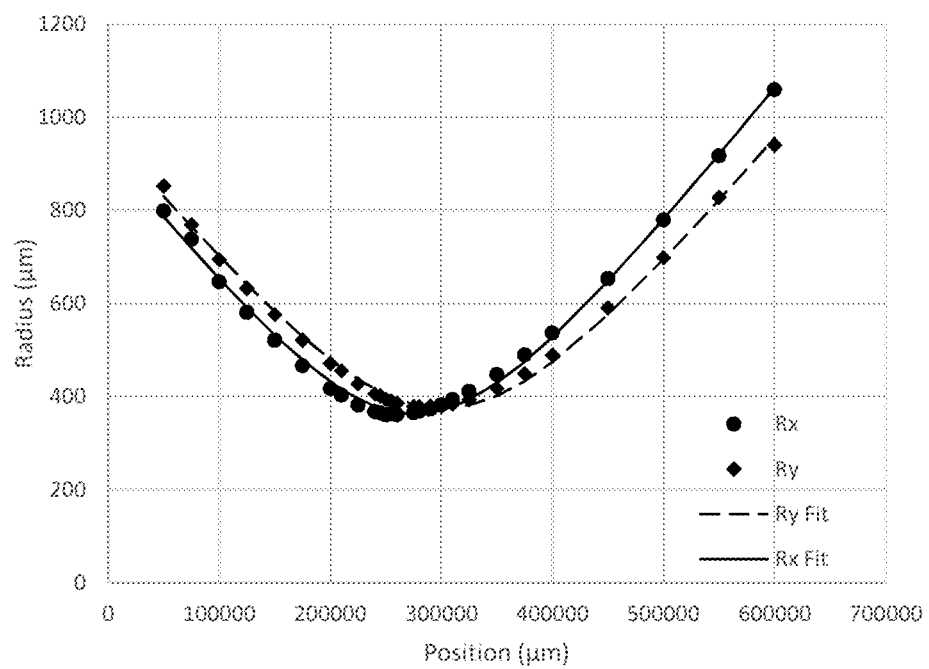
FIG. 4 is a graph illustrating beam propagation data of a system output (idler) at 3416 nm wavelength according to some embodiments of inventive concepts.

FIG. 4 is a graph illustrating an example of converted power and efficiency for two CW tunable laser sources (e.g., pump and signal laser sources) coupled into a 50 mm PPLN crystal operated at 102 degrees C. temperature with 30.49 µm period. Measured beam propagation data is fitted to $M^2$ function as defined by ISO Standard 11146 for a CW idler beam tuned to 3177 nm. The $M^2$ is 1.1 in the x-axis and 1.09 in the y-axis, indicating an extremely high quality idler output beam.

The generated output/idler beam was measured in accordance with ISO Standard 11146 to determine the $M^2$ parameter of the beam as shown in FIG. 4. The fitted $M^2 \leq 1.1$ in both axes indicates a high quality of the generated 3177 nm beam. In FIG. 2, the solid line represents wavelengths generated by first and second pump laser sources 111 and 115 (i.e., laser inputs having wavelengths $\lambda_1$ and $\lambda_2$), and the dashed line represents resulting wavelengths generated by nonlinear conversion material 131 to provide the idler output (i.e., laser output having wavelength $\lambda_3$). For example, the first data point on the solid line indicates that pump laser source wavelengths of $\lambda_1 \sim 1053$ nm and $\lambda_2 \sim 1575$ nm result in a system output wavelength of $\lambda_3 \sim 3177$ nm; and the last data point on the solid line indicates that pump laser source wavelengths of $\lambda_1 \sim 1068$ nm and $\lambda_2 \sim 1567$ result in a system output wavelength of $\lambda_3 \sim 3353$ nm.

Some embodiments of a third Example are discussed below.

Figure 5:
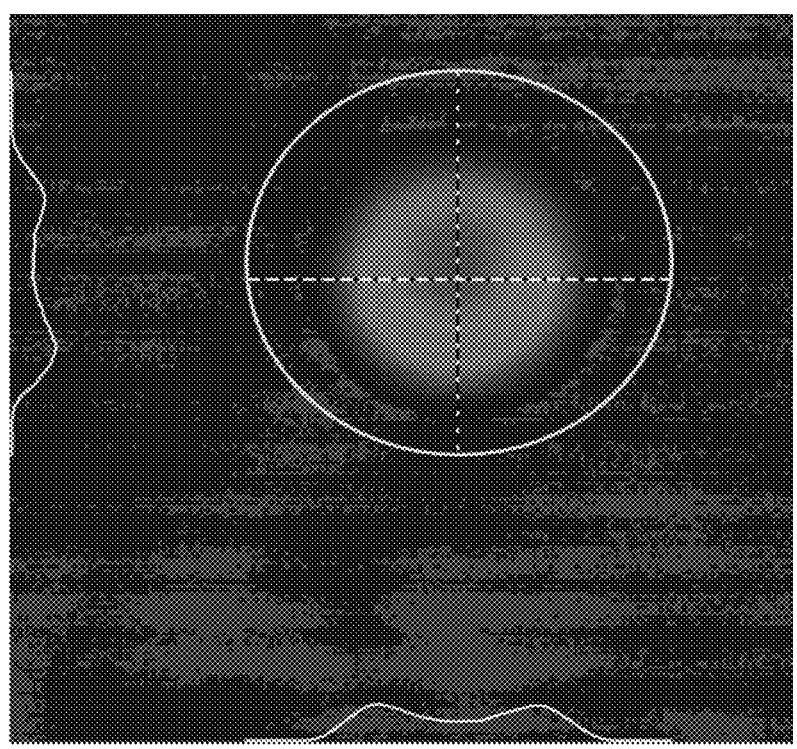
FIG. 5 is a diagram illustrating a beam profile of a system output (idler) at 3416 nm wavelength according to some embodiments of inventive concepts.

According to some embodiments of FIG. 1A, the system may be provided such that the two pump laser sources 111 and 115 are pulsed and temporally synchronized. Laser source 111 emits light at a wavelength of 1063.95 nm and operates at a 750 kHz pulse rate/frequency and at a 3.8 ns pulse width. Laser source 115 emits light at a wavelength of 1545.24 nm and operates at a 750 kHz pulse rate/frequency and at a 3.8 ns pulse width. Both laser sources 111 and 115 are externally triggered at the same rate, and the timing between triggers may be controlled using a delay generator. The spectral linewidths of laser sources 111 and 115 are respectively 0.2 nm and 0.32 nm. The output power of laser sources 111 and 115 are respectively 0.77 W and 1.45 W. FIG. 5 illustrates the emitted beam profile for the mid-infrared beam at 3416 nm with 151 mW at a conversion efficiency of 0.091 mW/($W^2$*cm) at the tuned laser source wavelengths of 1063.95 nm and 1545.24 nm.

Some embodiments of a fourth Example are discussed below.

Figure 6:
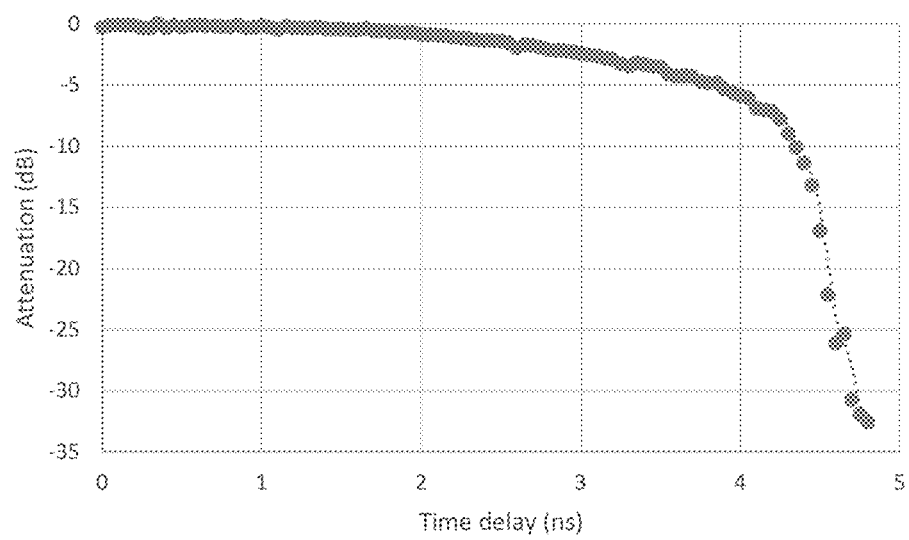
FIG. 6 is a graph illustrating measured Mid-Wave Infrared (MWIR) converted light attenuation with respect to a voltage induced time delay between laser pulses according to some embodiments of inventive concepts.

According to some embodiments of FIG. 1A, the system of the third Example may be provided such that the mid-infrared amplitude (average power) control is provided using temporal offset between the two pulse sources. The temporal offset between the pulses is electronically controlled allowing for high modulation frequencies of up to 10 kHz modulation. Because the pulse overlap determines the conversion efficiency, delaying the pulse of one laser source relative to the pulse of the other laser source allows for continuous (analog) control of the intensity with an extinction ratio exceeding 25 dB. FIG. 6 is a graph illustrating results for conversion for a few different values of the control voltage induced time delay. In FIG. 6, measured MWIR converted light attenuation is shown with respect to voltage induced time delay between laser systems, and the attenuation represents the negative of the extinction ratio.

According to some embodiments of inventive concepts, high speed tuning may be possible at both pump laser source wavelengths $\lambda_1$ and $\lambda_2$, with tuning speeds in a range of between about 10 nm/s and about 100,000 nm/s, and more particularly about 1000 nm/s.

According to some embodiments of inventive concepts, tuning of both pump and signal laser sources over the emission bandwidths of Ytterbium and Erbium can provide a wide emission range of output wavelengths 23 in a range of between about 2800 nm and about 4200 nm. According to some embodiments, wavelength ranges may be narrower focusing on smaller ranges of the Ytterbium and Erbium emission band in silica fiber.

According to some embodiments of inventive concepts, the converted wavelength maximum power may depend on the pump and signal laser sources used, and relatively high power may be achievable since both Ytterbium and Erbium lasers may provide high power emissions out of polarization maintaining single mode fibers. According to some embodiments, power conversions for a PPLN nonlinear crystal may be about 0.3 mW per $W^2$ per cm length.

According to some embodiments of inventive concepts, outputs of pump laser sources 111 and 115 may be spliced increasing system reliability, mechanical stability, and/or environmental stability, and dimensions of nonlinear conversion material 131 may be relatively small (e.g., on the order of about 1 mm×10 mm×50 mm for a PPLN crystal) thereby increasing stability.

According to some embodiments of inventive concepts, intensity modulation may be accomplished at 10's of kHz modulation rates with over 30 dB of extinction ratio.

According to some embodiments of inventive concepts, the output/idler emission from output filter 139 can be guided by an optical fiber 145.

FIG. 1B illustrates filter 139 according to some embodiments where output from lens 135 (shown in FIG. 1A) including wavelengths $\lambda_1$, $\lambda_2$, and 23 is filtered to provide output/idler emission of wavelength $\lambda_3$ through optical fiber 145. As further shown in FIG. 1B, further characterization of filtered outputs may be provided, for example, using a thermal power sensor 171 (S314C), a thermal power head (S302C) 173, a beam profiling camera (Pyrocam) 175, and/or optical filters (Spectrogon LP2850) 177 and 179.

According to some embodiments of inventive concepts, modulation approaches may allow for powers of outputs from both pump laser sources 111 and 115 to be kept constant (so that there is little/no change in thermal load on nonlinear conversion material 131) while still providing relatively high speed and/or high extinction ratio modulation. This result may be possible because conversion in a PPLN nonlinear crystal may depend on maintaining a stable temperature of the PPLN crystal. For example, by using pulsed inputs at wavelengths $\lambda_1$ and $\lambda_2$ from pump laser sources 111 and 115 as inputs to nonlinear conversion material 131 (as discussed herein, for example, with respect to FIGS. 8A to 8C), a power of an output from nonlinear conversion material at wavelength $\lambda_3$ can be modulated by modulating relative delays of the pulsed inputs without changing powers of pulsed inputs to nonlinear conversion material 131 from pump laser sources 111 and 115, thus maintaining a constant thermal load on nonlinear conversion material 131. Similarly, by modulating a polarization of one or both of inputs at wavelengths $\lambda_1$ and $\lambda_2$ from pump laser sources 111 and 115, a power of an output from nonlinear conversion material at wavelength $\lambda_3$ can be modulated without changing powers of inputs to nonlinear conversion material 131 from pump laser sources 111 and 115, thus maintaining a constant thermal load on nonlinear conversion material 131. By maintaining a constant thermal load on nonlinear conversion material 131, stability of wavelength $\lambda_3$ can be improved while changing the power of the laser output from nonlinear conversion material 131.

According to some embodiments of inventive concepts, output emission intensity at wavelength $\lambda_3$ can be modulated using control of a polarization of an output of one or both of pump laser source 111 at wavelength 2 or pump laser source 115 at wavelength $\lambda_2$.

According to some embodiments of inventive concepts, output emission intensity at wavelength $\lambda_3$ can be modulated using control of a temporal overlap of outputs from pump laser source 111 at wavelength 2 and pump laser source 115 at wavelength $\lambda_2$ in the case of a pulsed pump laser sources.

According to some embodiments of inventive concepts, output emission intensity at wavelength $\lambda_3$ can be modulated by control of spectral tuning of one or both of wavelength $\lambda_1$ generated by pump laser source 111 or wavelength $\lambda_2$ generated by pump laser source 115.

According to some embodiments of inventive concepts, output emission intensity can be modulated by control of an intensity of an output of one of the pump laser sources 111 or 115. This may reduce the speed as the thermal load on the nonlinear crystal 131 may change and conversion may depend on the temperature of the nonlinear crystal 131.

According to some embodiments of inventive concepts, the mid-infrared light output having wavelength $\lambda_3$ can be coupled to an optical fiber 145 (also referred to as a coupling fiber). The coupling fiber can be single mode since the converted light may have relatively high beam quality ($M^2<1.5$), or the coupling fiber can be a multimode optical fiber.

According to some embodiments of inventive concepts, the pump laser sources 111 and 115 can be pulsed at a high rate/frequency (e.g., at a rate/frequency >100 kHz) to enable near-continuous wave CW emission, with higher conversion efficiency at lower average powers.

Figure 7A:
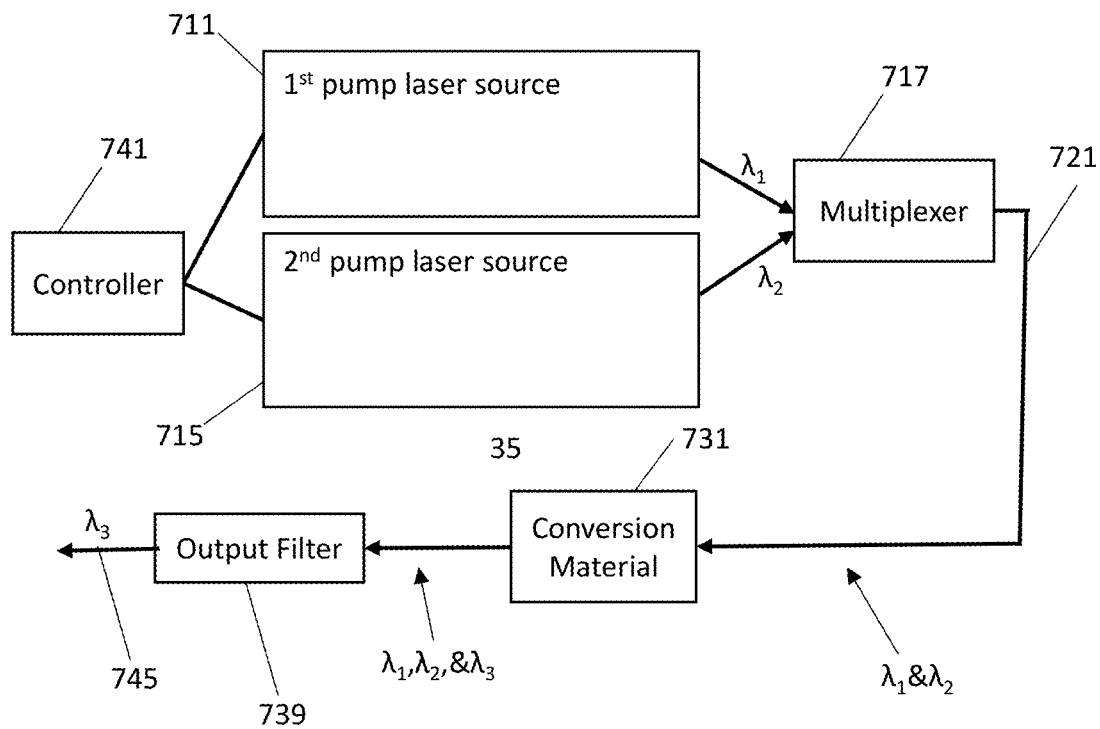
FIGS. 7A and 7B are block diagrams illustrating a laser system according to some embodiments of inventive concepts.

FIG. 7A is a block diagram illustrating a system providing a laser output at wavelength $\lambda_3$ according to some embodiments of inventive concepts. In FIG. 7A, for example, controller 741 and pump laser sources 711 and 715 may be provided as discussed above with respect to controller 141 and pump laser sources 111 and/or 115. For example, pump laser sources 711 and 715 may be respectively provided as discussed above with respect to pump laser sources 111 and 115 (so that $\lambda_1<\lambda_2<\lambda_3$ in FIG. 7A), or pump laser sources 711 and 715 may be respectively provided as discussed above with respect to pump laser sources 115 and 111 (so that $\lambda_2<\lambda_1<\lambda_3$ in FIG. 7A). Moreover, multiplexer 717, optical fiber 721, conversion material 731, output filter 737, and optical fiber 745 may be provided as discussed above with respect to multiplexer 117, optical fiber 121, nonlinear conversion material 131, output filter 139, and optical fiber 145. While not shown in FIG. 7A, the system of FIG. 7A may also include additional elements such as collimator 123, lens 125, and/or lens 135 as shown in FIG. 1A.

Figure 7B:
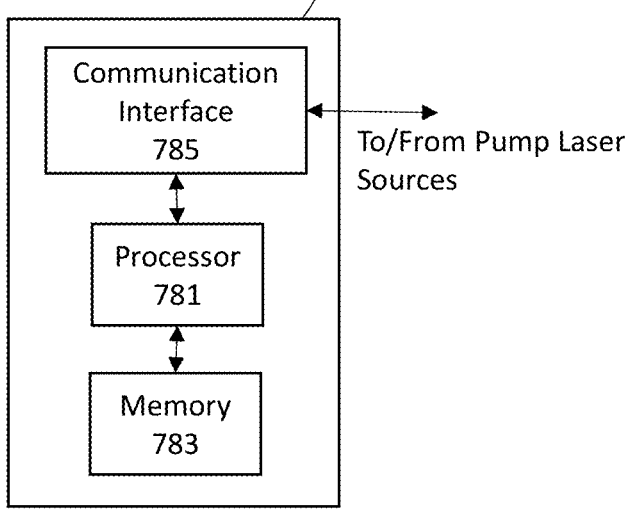

Controller 741 may include processor 781 (also referred to as processing circuitry), memory 783 (also referred to as memory circuitry), and communication interface 785 as shown in FIG. 7B. Processor 781 is coupled with memory 783, and memory 783 may include computer readable program code that when executed by processor 781 causes processor 781 to perform operations according to embodiments disclosed herein. Accordingly, processor 781 may execute computer readable program code of memory 783 to perform operations and/or to control communication interface 785 as disclosed herein. According to other embodiments, processor 781 may be defined to include memory so that separate memory is not required. Moreover, processor 781 may control pump laser sources 711 and/or 715 via communications/signals transmitted/received through communication interface 785 (also referred to as a network interface).

According to some embodiments of inventive concepts, the system includes first pump laser source 711 configured to generate a first laser input (having wavelength $\lambda_1$) with a first average power, second pump laser source 715 configured to generate a second pump laser input (having wavelength $\lambda_2$) with a second average power, conversion material 731 configured to provide conversion of the first and second laser inputs, and controller 741 coupled to first and/or second pump laser sources 711/715. Controller 741 is configured to control second pump laser source 715 to provide the second laser input at a first state with the second average power from pump laser source 715 so that conversion material 731 provides conversion of first laser input with the first average power and the second laser input at the first state with the second average power to generate a first laser output. Controller 741 is further configured to control second pump laser source 715 to provide the second laser input at a second state with the second average power from pump laser source 715 (after providing the second laser input at the first state) so that conversion material 731 provides conversion of the first laser input with the first average power and the second laser input at the second state with the second average power to generate a second laser output (having wavelength $\lambda_3$).

The first laser input from pump laser source 711 and the second laser input from pump laser source 715 may be combined by multiplexer 717, and the combination of the first and second laser inputs may be directed to conversion material 731 via optical fiber 721. Moreover, output from conversion material 731 may include wavelengths $\lambda_1$ and $\lambda_2$ of the first and second laser inputs and wavelength $\lambda_3$ of the laser output, and output from conversion material 731 may be directed to optical output filter 739 to remove wavelengths $\lambda_1$ and $\lambda_2$ of the laser inputs. Accordingly, the laser output at wavelength $\lambda_3$ may be provided to optical fiber 745 without wavelengths $\lambda_1$ and $\lambda_2$ of the first and second laser inputs.

The first and second states of the second laser input may be at least one of first and second temporal states of the second laser input, first and second polarization states of the second laser input, and/or first and second spectral states of the second laser input. Moreover, a combined power of the first laser input and the second laser input at the first state at conversion material 731 may be substantially the same as a combined power of the first laser input and the second laser input at the second state at conversion material 731. Accordingly, a uniformity of temperature of conversion material 731 may be maintained as the state of the second laser input changes to increase a stability of a wavelength $\lambda_3$ of the laser output (even if a power of the laser output changes as the state of the second laser input changes).

Conversion material 731 may be a nonlinear conversion material such as a periodically poled crystal (e.g., periodically poled beta barium borate, periodically poled potassium titanyl phosphate, periodically poled lithium triborate, and/or periodically poled lithium niobate). Accordingly, conversion of the first laser input and the second laser input at the first state may be provided using nonlinear conversion (e.g., DFG), and conversion of the first laser input and the second laser input at the second state may be provided using nonlinear conversion (e.g., DFG).

First pump laser source 711 may be a first fiber based pump laser source, and second pump laser source 715 may be a second fiber based pump laser source. For example, first fiber based pump laser source 711 may be a Ytterbium doped fiber based pump laser source, and second pump laser source 715 may be an Erbium doped fiber based pump laser source; or first pump laser source 711 may be an Erbium doped fiber based pump laser source, and second pump laser source 715 may be an Ytterbium doped fiber based pump laser source.

Figure 8A:
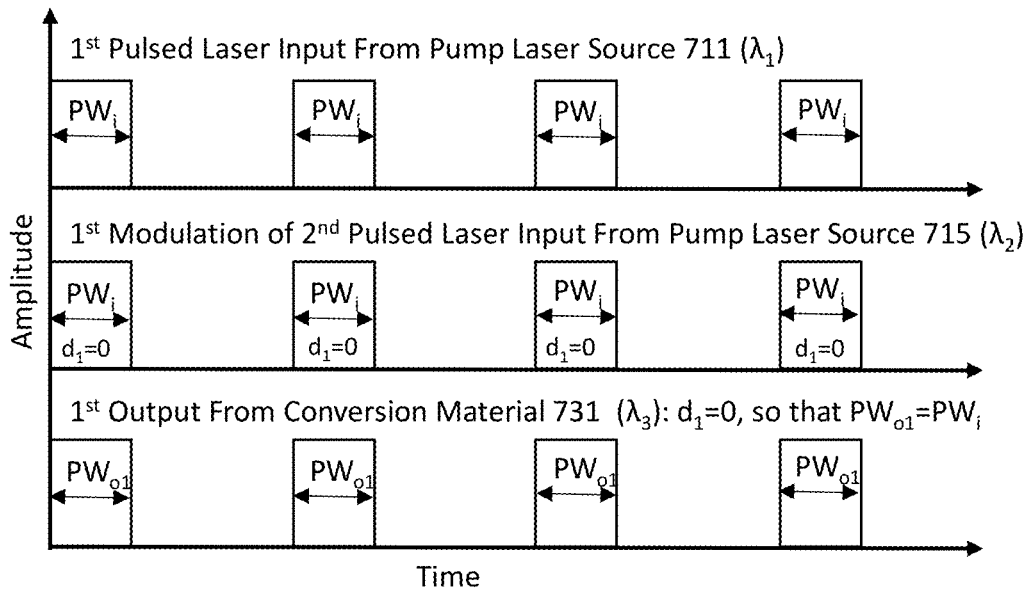
FIGS. 8A, 8B, and 8C are timing diagrams illustrating pulsed laser inputs with different relative pulse delays (e.g., $d_1$, $d_2$, and $d_3$) to provide different laser outputs according to some embodiments of inventive concepts.
Figure 8B:
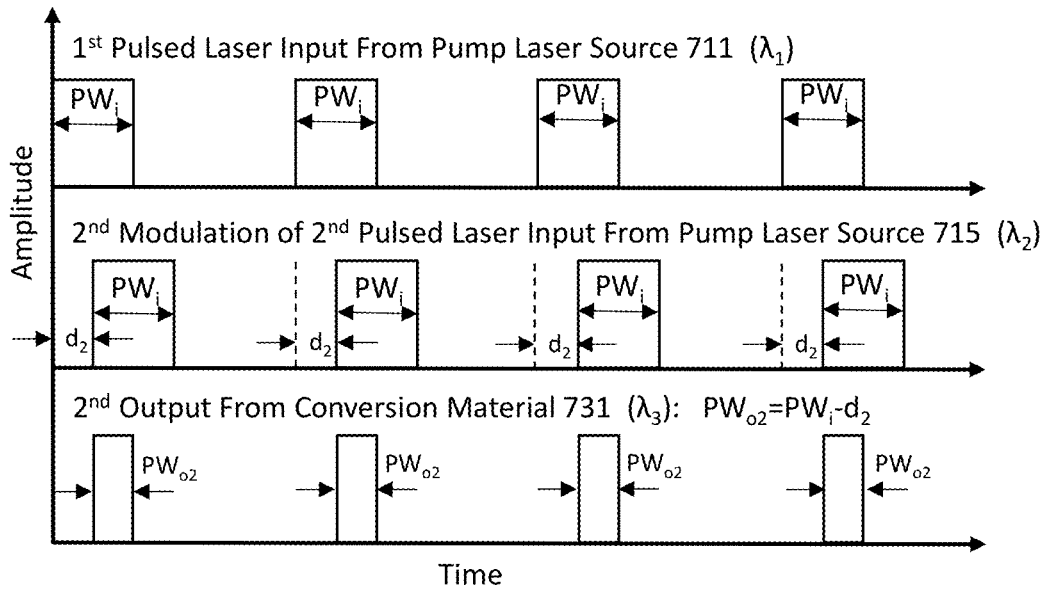
Figure 8C:
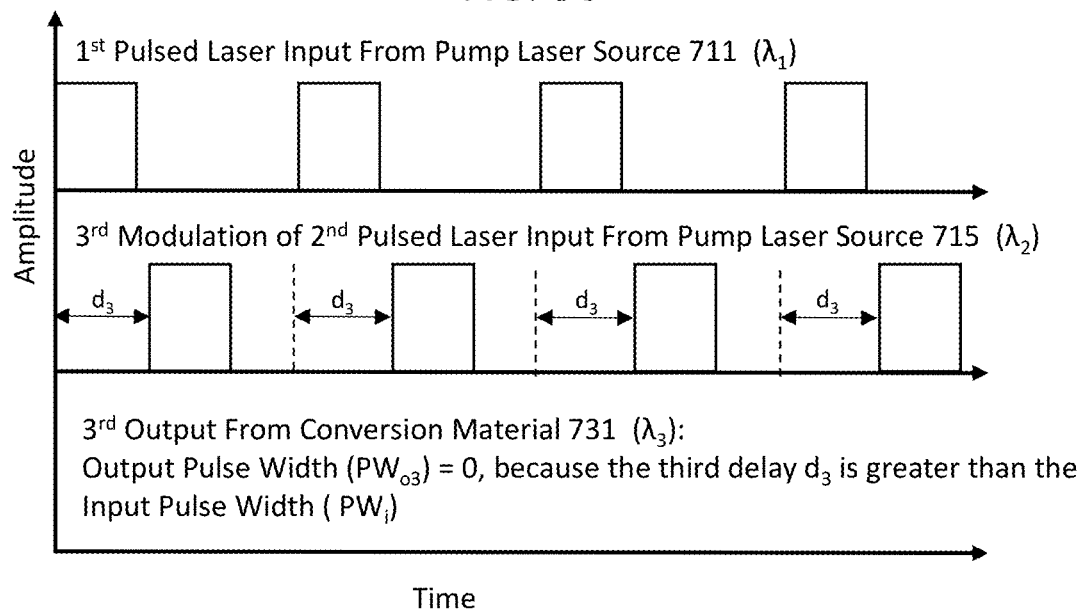

According to some embodiments of FIGS. 7A and 7B, controller 741 may be configured to control pump laser sources 711 and 715 to generate pulsed laser inputs (each having a pulse frequency $f_p$ and a pulse width $PW_i$) that are provided to conversion material 731 via multiplexer 717 and optical fiber 721. The first and second laser inputs (from pump laser sources 711 and 715) may be respective first and second pulsed laser inputs, and the first and second pulsed laser inputs may have the same pulse frequency $f_p$ and the same pulse width $PW_i$, and examples of such pulsed laser inputs are illustrated in FIGS. 8A, 8B, and 8C. In such embodiments, controller 741 may be configured to control pump laser source 715 to provide the second laser input at a first state with a first pulse delay $d_1$ (e.g., $d_1=0$) relative to pulses of the first laser input from pump laser source 711 as shown in FIG. 8A; to provide the second laser input at a second state with a second pulse delay $d_2$ (e.g., $0<d_2<PW_i$) relative to pulses of the first laser input from pump laser source 711 as shown in FIG. 8B (e.g., after providing the second laser input at the first state); and to provide the second laser input at a third state with a third pulse delay $d_3$ (e.g., $PW_i<d_3$) relative to pulses of the first laser input from pump laser source 711 as shown in FIG. 8C (e.g., after providing the second laser input at the second state). Accordingly, the first, second, and third pulse delays may be different.

In embodiments illustrated in FIGS. 8A and 8B, a temporal overlap between pulses of the first pulsed laser input and pulses of the second pulsed laser input at the first state with pulse delay $d_1$ defines a first output pulse width $PW_{o1}$ (e.g., $PW_{o1}=PW_i$) as shown in FIG. 8A; and a temporal overlap between pulses of the first pulsed laser input and pulses of the second pulsed laser input at the second state with pulse delay $d_2$ defines an output pulse width $PW_{o2}$ ($PW_{o2}=PW_i-d_2$) as shown in FIG. 8B. Accordingly, an average power of the first pulsed laser output from conversion material 731 in FIG. 8A is greater than an average power of the second pulsed laser output from conversion material 731 in FIG. 8B because the first output pulse width $PW_{o1}$ is greater than the second output pulse width $PW_{o2}$.

Similarly, in embodiments illustrated in FIGS. 8B and 8C, a temporal overlap between pulses of the first pulsed laser input and pulses of the second pulsed laser input at the second state with pulse delay $d_2$ defines the second output pulse width $PW_{o2}$ (e.g., $PW_{o2}=PW_i-d_2$) as shown in FIG. 8B; and a temporal overlap between pulses of the first pulsed laser input and pulses the second pulsed laser input at the third state with the third pulse delay $d_3$ defines a third output pulse width $PW_{o3}$ ($PW_{o3}=0$, because the third delay $d_3$ is greater than the input pulse width $PW_i$). Accordingly, a power of the second pulsed laser output from conversion material 731 in FIG. 8B is greater than a power of the third laser output from conversion material 731 in FIG. 8C because the second output pulse width $PW_{o2}$ is greater than the third output pulse width $PW_{o3}$.

In embodiments discussed above with respect to FIGS. 7A, and 7B and FIGS. 8A, 8B, and 8C, pulsed laser inputs may be provided by pump laser sources 111 and 115 including electronic triggers and/or delay controllers. For example, pump laser source 111 may include an electronic trigger that operates responsive to controller 741 to generate the first pulsed laser input having wavelength $\lambda_1$; and pump laser source 115 may include an electronic trigger and a delay control that both operate responsive to controller 741 to generate the second pulsed laser input so that pulses of the second pulsed laser input can be provided with different delay states relative to pulses of the first pulsed laser input to provide different output powers at wavelength $\lambda_3$.

By changing a pulse delay (d) of pump laser source 711 and/or 715 without changing average powers of the first and second laser inputs from pump laser sources 711 and 715 (i.e., maintaining the same pulse widths from pump laser sources 711 and 715), conversion material 731 may be subjected to a relatively constant thermal load while changing an average power of a pulsed laser output, thereby increasing a wavelength stability of the pulsed laser output.

According to some other embodiments of FIGS. 7A and 7B, controller 741 may be configured to control the second pump laser source 115 to provide the second laser input at a first state with a first polarization (also referred to as a first polarization state) and to control the second pump laser source to provide the second laser input at a second state with a second polarization (also referred to as a second polarization state), where the first and second polarizations are different. Moreover, the conversion material may be a crystal, and the first and second polarizations may be provided relative to the crystal. For example, the crystal may be a periodically poled crystal having a crystal period, the first polarization of the second laser input may have a first alignment with respect to a dipole moment of the crystal period, the second polarization of the second laser input may have a second alignment with respect to the dipole moment of the crystal period, and the first and second alignments may be different. The first alignment may be closer than the second alignment, and a power of the first laser output may be greater than a power of the second laser output; or the second alignment may be closer than the first alignment and a power of the second laser output may be greater than a power of the first laser output. The first polarization may have a first spatial orientation relative to the dipole moment of the crystal period, the second polarization may have a second spatial orientation relative to the dipole moment of the crystal period, and the first and second spatial orientations may be different. According to such embodiments, pump laser source 715 may include a polarization controller configured to control the second laser input to provide the first and second polarizations responsive to controller 741. By changing a polarization of pump laser source 711 and/or 715 without changing powers of the first and/or second laser inputs from pump laser sources 711 and 715, conversion material 731 may be subjected to a constant thermal load while changing a laser output power, thereby increasing a wavelength stability of the laser output.

According to still other embodiments of FIGS. 7A and 7B, the first laser input from pump laser source 711 may have a first wavelength, and controller 741 may be configured to control pump laser source 715 to provide the second laser input at the first state with a second wavelength and to control pump laser source 715 to provide the second laser input at the second state with a third wavelength, with the first, second, and third wavelengths being different. For example, the first wavelength may be less than the second and third wavelengths, or the first wavelength may be greater than the second and third wavelengths. Moreover, the first and second laser outputs may have a fourth wavelength that is greater than the first, second, and third wavelengths. According to such embodiments, pump laser source 715 may include a tunable seed configured to tune the second laser input to the second and third wavelengths responsive to controller 741. By changing a wavelength of pump laser source 711 and/or 715 without changing powers of the first and/or second laser inputs from pump laser sources 711 and 715, conversion material 731 may be subjected to a constant thermal load while changing a laser output power, thereby increasing a wavelength stability of the laser output.

Some example embodiments of inventive concepts are provided below.

Embodiment 1. A method providing a laser output, the method comprising: providing a first laser input with a first average power from a first pump laser source 711; providing a second laser input at a first state with a second average power from a second pump laser source 715; generating a first laser output based on conversion of the first laser input with the first average power and the second laser input at the first state with the second average power; after generating the first laser output, providing the second laser input at a second state with the second average power from the second pump laser source 715, wherein the first and second states of the second laser input are different, and wherein the second average power remains unchanged for the first and second states of the second laser input; and after generating the first laser output, generating a second laser output based on conversion of the first laser input with the first average power and the second laser input at the second state with the second average power.

Embodiment 2. The method according to Embodiment 1 further comprising: providing a first control signal from a controller 741, wherein the second pump laser source 715 is configured to generate the second laser input at the first state responsive to the first control signal from the controller 741; and after generating the first laser output, providing a second control signal from the controller 741, wherein the second pump laser source 715 is configured to generate the second laser input at the second state responsive to the second control signal from the controller 741.

Embodiment 3. The method according to any one of Embodiments 1-2, wherein generating the first laser output comprises generating the first laser output based on conversion of the first laser input with the first average power and the second laser input at the first state with the second average power using difference frequency generation (DFG), and wherein generating the second laser output comprises generating the second laser output based on conversion of the first laser input with the first average power and the second laser input at the second state with the second average power using DFG.

Embodiment 4. The method according to any of Embodiments 1-3, wherein the first and second laser inputs comprise respective first and second pulsed laser inputs, wherein the first pulsed laser input has a pulse frequency, wherein the second pulsed laser input has the pulse frequency, wherein the first and second laser outputs are respective first and second pulsed laser outputs, wherein providing the second pulsed laser input at the first state comprises providing the second pulsed laser input with a first pulse delay relative to pulses of the first pulsed laser input; and wherein providing the second pulsed laser input at the second state comprises providing the second pulsed laser input with a second pulse delay relative to pulses of the first pulsed laser input, wherein the first and second pulse delays are different.

Embodiment 5. The method according to Embodiment 4, wherein the first pulsed laser input has a pulse width $PW_i$, and wherein the first and second states of the second pulsed laser input have the pulse width $PW_i$.

Embodiment 6. The method according to any of Embodiments 4-5, wherein the first pulse delay $d_3$ is greater than the second pulse delay $d_2$, or wherein the first pulse delay $d_1$ is less than the second pulse delay $d_2$.

Embodiment 7. The method according to any of Embodiments 4-6, wherein a temporal overlap between pulses of the first pulsed laser input and pulses of the second pulsed laser input at the first state is greater than a temporal overlap between pulses of the first pulsed laser input and pulses of the second pulsed laser input at the second state so that a power of the first pulsed laser output is greater than a power of the second pulsed laser output.

Embodiment 8. The method according to any of Embodiments 4-6, wherein a temporal overlap between pulses of the first pulsed laser input and pulses of the second pulsed laser input at the first state is less than a temporal overlap between pulses of the first pulsed laser input and pulses of the second pulsed laser input at the second state so that a power of the first pulsed laser output is less than a power of the second pulsed laser output.

Embodiment 9. The method according to any of Embodiments 1-3, wherein the second laser input at the first state has a first polarization, wherein the second laser input at the second state has a second polarization, and wherein the first and second polarizations are different.

Embodiment 10. The method according to Embodiment 9, wherein conversion is provided using a crystal 731, and wherein the first and second polarizations are provided relative to the crystal 731.

Embodiment 11. The method according to Embodiment 10, wherein the crystal 731 comprises a periodically poled crystal having a crystal period, wherein the first polarization of the second laser input has a first alignment with respect to a dipole moment of the crystal period, wherein the second polarization of the second laser input has a second alignment with respect to the dipole moment of the crystal period, and wherein the first and second alignments are different.

Embodiment 12. The method according to Embodiment 11, wherein the first alignment is closer than the second alignment and a power of the first laser output is greater than a power of the second laser output, or wherein the second alignment is closer than the first alignment and a power of the second laser output is greater than a power of the first laser output.

Embodiment 13. The method according to any of Embodiments 11-12, wherein the first polarization has a first spatial orientation relative to the dipole moment of the crystal period, wherein the second polarization has a second spatial orientation relative to the dipole moment of the crystal period, and wherein the first and second spatial orientations are different.

Embodiment 14. The method according to any of Embodiments 1-13, wherein the first laser input has a first wavelength $\lambda_1$, wherein the second laser input at the first state has a second wavelength $\lambda_2$, wherein the second laser input at the second state has the second wavelength $\lambda_2$, wherein the first laser output has a third wavelength $\lambda_3$, wherein the second laser output has the third wavelength $\lambda_3$, and where the third wavelength is a function of the first and second wavelengths.

Embodiment 15. The method according to Embodiments 14, wherein the function is based on difference frequency generation (DFG).

Embodiment 16. The method according to any of Embodiments 14-15, wherein the first wavelength is greater than the second wavelength, or wherein the first wavelength is less than the second wavelength.

Embodiment 17. The method according to any of Embodiments 14-16, wherein the first wavelength is less than the third wavelength, and wherein the second wavelength is less than the third wavelength.

Embodiment 18. The method according to any of Embodiments 1-3, wherein the first laser input has a first wavelength, wherein the second laser input at the first state has a second wavelength, and wherein the second laser input at the second state has a third wavelength, wherein the first, second, and third wavelengths are different.

Embodiment 19. The method according to Embodiment 18, wherein the first wavelength is less than the second and third wavelengths, or wherein the first wavelength is greater than the second and third wavelengths.

Embodiment 20. The method according to any of Embodiments 18-19, wherein the first and second laser outputs have a fourth wavelength that is greater than the first, second, and third wavelengths.

Embodiment 21. The method according to any of Embodiments 1-20, wherein a combined power of the first laser input and the second laser input at the first state is substantially the same as a combined power of the first laser input and the second laser input at the second state.

Embodiment 22. The method according to any of Embodiments 1-21, wherein the first and second states of the second laser input comprise at least one of first and second temporal states of the second laser input, first and second polarization states of the second laser input, and/or first and second spectral states of the second laser input.

Embodiment 23. The method according to any of Embodiments 1-22, wherein a combined power of the first laser input and the second laser input at the first state is the same as a combined power of the first laser input and the second laser input at the second state, and wherein powers of the first and second laser outputs are different.

Embodiment 24. The method according to any of Embodiments 1-23, wherein generating the first laser output comprises generating the first laser output using a crystal 731 to provide the conversion of the first laser input with the first average power and the second laser input at the first state with the second average power, and wherein generating the second laser output comprises generating the second laser output using the crystal 731 to provide the conversion of the first laser input with the first average power and the second laser input at the second state with the second average power.

Embodiment 25. The method according to Embodiment 24, wherein the crystal 731 comprises a periodically poled crystal (e.g., periodically poled beta barium borate, periodically poled potassium titanyl phosphate, periodically poled lithium triborate, and/or periodically poled lithium niobate).

Embodiment 26. The method according to any of Embodiments 24-25 further comprising: multiplexing the first laser input from the first pump laser source and the second laser input from the second pump laser source to direct a combination of the first and second laser inputs to the crystal 731.

Embodiment 27. The method according to any of Embodiments 24-26, wherein the crystal 731 is subject to a constant thermal load when generating first and the second laser outputs.

Embodiment 28. The method according to any of Embodiments 1-27, wherein the first pump laser source 711 comprises a first fiber based pump laser source, and wherein the second pump laser source 715 comprises a second fiber based pump laser source.

Embodiment 29. The method according to Embodiment 28, wherein the first fiber based pump laser source comprises an Ytterbium doped fiber based pump laser source and the second pump laser source comprises an Erbium doped fiber based pump laser source, or wherein the first pump laser source comprises an Erbium doped fiber based pump laser source and the second pump laser source comprises an Ytterbium doped fiber based pump laser source.

Embodiment 30. The method according to any of Embodiments 1-29, wherein conversion comprises nonlinear conversion.

Embodiment 31. A system providing a laser output, the system comprising: a first pump laser source 711 configured to generate a first laser input with a first average power; a second pump laser source 715 configured to generate a second pump laser input with a second average power; a conversion material 731 configured to provide conversion of the first and second laser inputs; and a controller 741 coupled to the second pump laser source 715, wherein the controller 741 is configured to control the second pump laser source 715 to, provide the second laser input at a first state with the second average power from the second pump laser source 715 so that the conversion material 731 provides conversion of the first laser input with the first average power and the second laser input at the first state with the second average power to generate a first laser output, and provide the second laser input at a second state with the second average power after providing the second laser input at the first state with the second average power so that the conversion material 731 provides conversion of the first laser input with the first average power and the second laser input at the second state with the second average power to generate a second laser output, wherein the second average power remains unchanged for the first and second states of the second laser input.

Embodiment 32. The system according to Embodiment 31, wherein the conversion material 731 is configured to provide conversion of the first laser input with the first average power and the second laser input at the first state with the second average power to generate the first laser output using difference frequency generation (DFG), and wherein the conversion material 731 is configured to provide conversion of the first laser input with the first average power and the second laser input at the second sate with the second average power to generate the second laser output using DFG.

Embodiment 33. The system according to any of Embodiments 31-32, wherein the first and second laser inputs comprise respective first and second pulsed laser inputs, wherein the first pulsed laser input has a pulse frequency, wherein the second pulsed laser input has the pulse frequency, wherein the first and second laser outputs are respective first and second pulsed laser outputs, wherein the controller 741 is configured to control the second pump laser source 715 to provide the second pulsed laser input at the first state with a first pulse delay relative to pulses of the first pulsed laser input, and wherein the controller 741 is configured to control the second pump laser source 715 to provide the second pulsed laser input at the second state with a second pulse delay relative to pulses of the first pulsed laser input, wherein the first and second pulse delays are different.

Embodiment 34. The system according to Embodiment 33, wherein the first pulsed laser input has a pulse width $PW_i$, and wherein the first and second states of the second pulsed laser input have the pulse width $PW_i$.

Embodiment 35. The system according to any of Embodiments 33-34, wherein the first pulse delay $d_3$ is greater than the second pulse delay $d_2$, or wherein the first pulse delay $d_1$ is less than the second pulse delay $d_2$.

Embodiment 36. The system according to any of Embodiments 33-35, wherein a temporal overlap between pulses of the first pulsed laser input and pulses of the second pulsed laser input at the first state is greater than a temporal overlap between pulses of the first pulsed laser input and pulses of the second pulsed laser input at the second state so that a power of the first pulsed laser output is greater than a power of the second pulsed laser output.

Embodiment 37. The system according to any of Embodiments 33-35, wherein a temporal overlap between pulses of the first pulsed laser input and pulses of the second pulsed laser input at the first state is less than a temporal overlap between pulses of the first pulsed laser input and pulses of the second pulsed laser input at the second state so that a power of the first pulsed laser output is less than a power of the second pulsed laser output.

Embodiment 38. The system according to any of Embodiments 31-32, wherein the controller 741 is configured to control the second pump laser source 715 to provide the second laser input at the first state with a first polarization and to control the second pump laser source 741 to provide the second laser input at the second state with a second polarization, wherein the first and second polarizations are different.

Embodiment 39. The system according to Embodiment 38, wherein the conversion material 731 comprises a crystal, and wherein the first and second polarizations are provided relative to the crystal.

Embodiment 40. The system according to Embodiment 39, wherein the crystal 731 comprises a periodically poled crystal having a crystal period, wherein the first polarization of the second laser input has a first alignment with respect to a dipole moment of the crystal period, wherein the second polarization of the second laser input has a second alignment with respect to the dipole moment of the crystal period, and wherein the first and second alignments are different.

Embodiment 41. The system according to Embodiment 40, wherein the first alignment is closer than the second alignment and a power of the first laser output is greater than a power of the second laser output, or wherein the second alignment is closer than the first alignment and a power of the second laser output is greater than a power of the first laser output.

Embodiment 42. The system according to any of Embodiments 40-41, wherein the first polarization has a first spatial orientation relative to the dipole moment of the crystal period, wherein the second polarization has a second spatial orientation relative to the dipole moment of the crystal period, and wherein the first and second spatial orientations are different.

Embodiment 43. The system according to any of Embodiments 31-42, wherein the first laser input has a first wavelength, wherein the second laser input at the first state has a second wavelength, wherein the second laser input at the second state has the second wavelength, wherein the first laser output has a third wavelength, wherein the second laser output has the third wavelength, and where the third wavelength is a function of the first and second wavelengths.

Embodiment 44. The system according to Embodiment 43, wherein the function is based on difference frequency generation (DFG).

Embodiment 45. The system according to any of Embodiments 43-44, wherein the first wavelength is greater than the second wavelength, or wherein the first wavelength is less than the second wavelength.

Embodiment 46. The system according to any of Embodiments 43-45, wherein the first wavelength is less than the third wavelength, and wherein the second wavelength is less than the third wavelength.

Embodiment 47. The system according to any of Embodiments 31-32, wherein the first laser input has a first wavelength, wherein the controller 741 is configured to control the second pump laser source 715 to provide the second laser input at the first state with a second wavelength, and wherein the controller 741 is configured to control the second pump laser source 715 to provide the second laser input at the second state with a third wavelength, and wherein the first, second, and third wavelengths are different.

Embodiment 48. The system according to Embodiment 47, wherein the first wavelength is less than the second and third wavelengths, or wherein the first wavelength is greater than the second and third wavelengths.

Embodiment 49. The system according to any of Embodiments 47-48, wherein the first and second laser outputs have a fourth wavelength that is greater than the first, second, and third wavelengths.

Embodiment 50. The system according to any of Embodiments 31-49, wherein a combined power of the first laser input and the second laser input at the first state is substantially the same as a combined power of the first laser input and the second laser input at the second state.

Embodiment 51. The system according to any of Embodiments 31-50, wherein the first and second states of the second laser input comprise at least one of first and second temporal states of the second laser input, first and second polarization states of the second laser input, and/or first and second spectral states of the second laser input.

Embodiment 52. The system according to any of Embodiments 31-51, wherein a combined power of the first laser input and the second laser input at the first state is substantially the same as a combined power of the first laser input and the second laser input at the second state, and wherein powers of the first and second laser outputs are different.

Embodiment 53. The system according to any of Embodiments 31-52, wherein the conversion material 731 comprises a periodically poled crystal (e.g., periodically poled beta barium borate, periodically poled potassium titanyl phosphate, periodically poled lithium triborate, and/or periodically poled lithium niobate).

Embodiment 54. The system according to any of Embodiments 31-53 further comprising: a multiplexer 717 configured to combine the first laser input from the first pump laser source 711 and the second laser input from the second pump laser source 715 to provide a combination of the first and second laser inputs; and an optical fiber 721 configured to direct the combination of the first and second laser inputs to the conversion material 731.

Embodiment 55. The system according to any of Embodiments 31-54, wherein the first pump laser source 711 comprises a first fiber based pump laser source, and wherein the second pump laser source 715 comprises a second fiber based pump laser source.

Embodiment 56. The system according to Embodiment 55, wherein the first fiber based pump laser source 711 comprises an Ytterbium doped fiber based pump laser source and the second pump laser source 715 comprises an Erbium doped fiber based pump laser source, or wherein the first pump laser source 711 comprises an Erbium doped fiber based pump laser source and the second pump laser source 715 comprises an Ytterbium doped fiber based pump laser source.

Embodiment 57. The system according to any of Embodiments 31-56, wherein the conversion material 731 comprises a nonlinear conversion material, wherein conversion of the first laser input and the second laser input at the first state comprises nonlinear conversion, and wherein conversion of the first laser input and the second laser input at the second state comprises nonlinear conversion.

Embodiment 58. The system according to any of Embodiments 31-57, wherein the conversion material 731 is subject to a constant thermal load when generating the first and second laser outputs.

Further embodiments of inventive concepts may be disclosed by Augustus X. Carlson et al. in the publication entitled "Dual Fiber Laser Pumped Tunable Mid-Infrared Laser Source With High Speed Modulation" (Proc. of SPIE, Vol. 12882, pages 1288206-1 to 1288206-11, March 2024), the disclosure of which is hereby incorporated herein in its entirety by reference.

Additional disclosure is provided below.

The terminology used herein is for the purpose of describing particular embodiments only and is not intended to be limiting of inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. The term "and/or" includes any and all combinations of one or more of the associated listed items.

It will be understood that, although the terms first, second, third, etc. may be used herein to describe various elements, these elements should not be limited by these terms. These terms are only used to distinguish one element from another element. Thus, a first element discussed herein could be termed a second element without departing from the scope of the present inventive concepts.

It will also be understood that when an element is referred to as being "coupled" to/with or "connected" to/with another element, it can be directly coupled or connected to/with the other element, or intervening elements may be present. In contrast, when an element is referred to as being "directly coupled" to/with or "directly connected" to/with another element, there are no intervening elements present. Similarly, when an operation/element is referred to as being "responsive to" or "in response to" another event/operation/element, it can be directly responsive to or directly in response to the other operation/element or intervening events/operations/elements may be present. In contrast, when an operation/element is referred to as being "directly responsive to" or "directly in response to" another event/operation/element, there are no intervening events/operations/elements present.

Unless otherwise defined, all terms (including technical and scientific terms) used herein have the same meaning as commonly understood by one of ordinary skill in the art to which the inventive concepts herein belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The operations of any methods disclosed herein do not have to be performed in the exact order disclosed, unless an operation is explicitly described as following or preceding another operation and/or where it is implicit that an operation must follow or precede another operation. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description herein.

While inventive concepts have been particularly shown and described with reference to examples of embodiments thereof, it will be understood that various changes in form and details may be made therein without departing from the spirit of concepts and/or embodiments disclosed herein.

The invention claimed is:

1. A method providing a laser output, the method comprising:
   providing a first laser input with a first average power from a first pump laser source;
   providing a second laser input at a first state with a second average power from a second pump laser source;
   generating a first laser output using a crystal to provide conversion of the first laser input with the first average power and the second laser input at the first state with the second average power using difference frequency generation (DFG);
   after generating the first laser output, providing the second laser input at a second state with the second average power from the second pump laser source, wherein the first and second states of the second laser input are different, and wherein the second average power remains unchanged for the first and second states of the second laser input, and wherein a combined power of the first laser input and the second laser input at the first state is the same as a combined power of the first laser input and the second laser input at the second state; and
   after generating the first laser output, generating a second laser output using the crystal to provide conversion of the first laser input with the first average power and the second laser input at the second state with the second average power using DFG, and wherein powers of the of the first and second laser outputs are different.

2. The method of claim 1, wherein a wavelength of the first laser input is different than wavelengths of the second laser input at the first and second states.

3. The method of claim 1, wherein the first laser input has a first wavelength, wherein the second laser input at the first state has a second wavelength, wherein the second laser input at the second state has the second wavelength, wherein the first laser output has a third wavelength, wherein the second laser output has the third wavelength, and wherein the third wavelength is a function of the first and second wavelengths based on DFG.

4. A method providing a laser output, the method comprising:
   providing a first laser input with a first average power from a first pump laser source;
   providing a second laser input at a first state with a second average power from a second pump laser source;
   generating a first laser output based on conversion of the first laser input with the first average power and the second laser input at the first state with the second average power;
   after generating the first laser output, providing the second laser input at a second state with the second average power from the second pump laser source, wherein the first and second states of the second laser input are different, and wherein the second average power remains unchanged for the first and second states of the second laser input, and wherein a combined power of the first laser input and the second laser input at the first state is the same as a combined power of the first laser input and the second laser input at the second state; and after generating the first laser output, generating a second laser output based on conversion of the first laser input with the first average power and the second laser input at the second state with the second average power, and wherein powers of the of the first and second laser outputs are different.

5. The method according to claim 4 further comprising:
providing a first control signal from a controller, wherein the second pump laser source is configured to generate the second laser input at the first state responsive to the first control signal from the controller; and after generating the first laser output, providing a second control signal from the controller, wherein the second pump laser source is configured to generate the second laser input at the second state responsive to the second control signal from the controller.

6. The method according to claim 4,
wherein generating the first laser output comprises generating the first laser output based on conversion of the first laser input with the first average power and the second laser input at the first state with the second average power using difference frequency generation (DFG), and wherein generating the second laser output comprises generating the second laser output based on conversion of the first laser input with the first average power and the second laser input at the second state with the second average power using DFG.

7. The method according to claim 4,
wherein the first and second laser inputs comprise respective first and second pulsed laser inputs,
wherein the first pulsed laser input has a pulse frequency,
wherein the second pulsed laser input has the pulse frequency,
wherein the first and second laser outputs are respective first and second pulsed laser outputs,
wherein providing the second pulsed laser input at the first state comprises providing the second pulsed laser input with a first pulse delay relative to pulses of the first pulsed laser input; and
wherein providing the second pulsed laser input at the second state comprises providing the second pulsed laser input with a second pulse delay relative to pulses of the first pulsed laser input, wherein the first and second pulse delays are different.

8. The method according to claim 4, wherein conversion is provided using a crystal.

9. The method according to claim 4, wherein the first laser input has a first wavelength, wherein the second laser input at the first state has a second wavelength, wherein the second laser input at the second state has the second wavelength, wherein the first laser output has a third wavelength, wherein the second laser output has the third wavelength, and where the third wavelength is a function of the first and second wavelengths.

10. The method according to claim 9, wherein the function is based on difference frequency generation (DFG).

11. The method according to claim 4, wherein generating the first laser output comprises generating the first laser output using a crystal to provide the conversion of the first laser input with the first average power and the second laser input at the first state with the second average power, and wherein generating the second laser output comprises generating the second laser output using the crystal to provide the conversion of the first laser input with the first average power and the second laser input at the second state with the second average power.

12. The method according to claim 4, wherein the first pump laser source comprises a first fiber based pump laser source, and wherein the second pump laser source comprises a second fiber based pump laser source.

13. The method according to claim 4 further comprising:
providing a first control signal from a controller, wherein the second pump laser source is configured to generate the second laser input at the first state responsive to the first control signal from the controller; and after generating the first laser output, providing a second control signal from the controller, wherein the second pump laser source is configured to generate the second laser input at the second state responsive to the second control signal from the controller;

wherein generating the first laser output comprises generating the first laser output based on conversion of the first laser input with the first average power and the second laser input at the first state with the second average power using a crystal providing difference frequency generation (DFG), and wherein generating the second laser output comprises generating the second laser output based on conversion of the first laser input with the first average power and the second laser input at the second state with the second average power using the crystal providing DFG.

14. A system providing a laser output, the system comprising:
a first pump laser source configured to generate a first laser input with a first average power;
a second pump laser source configured to generate a second pump laser input with a second average power;
a conversion material configured to provide conversion of the first and second laser inputs; and
a controller coupled to the second pump laser source, wherein the controller is configured to control the second pump laser source to,
provide the second laser input at a first state with the second average power from the second pump laser source so that the conversion material provides conversion of the first laser input with the first average power and the second laser input at the first state with the second average power to generate a first laser output, and
provide the second laser input at a second state with the second average power after providing the second laser input at the first state with the second average power so that the conversion material provides conversion of the first laser input with the first average power and the second laser input at the second state with the second average power to generate a second laser output, wherein the second average power remains unchanged for the first and second states of the second laser input, wherein a combined power of the first laser input and the second laser input at the first state is the same as a combined power of the first laser input and the second laser input at the second state, and wherein powers of the first and second laser outputs are different.

15. The system according to claim 14,
wherein the conversion material is configured to provide conversion of the first laser input with the first average power and the second laser input at the first state with the second average power to generate the first laser output using difference frequency generation (DFG), and wherein the conversion material is configured to provide conversion of the first laser input with the first average power and the second laser input at the second sate with the second average power to generate the second laser output using DFG.

16. The system according to claim 14,
wherein the first and second laser inputs comprise respective first and second pulsed laser inputs,
wherein the first pulsed laser input has a pulse frequency,
wherein the second pulsed laser input has the pulse frequency,
wherein the first and second laser outputs are respective first and second pulsed laser outputs,
wherein the controller is configured to control the second pump laser source to provide the second pulsed laser input at the first state with a first pulse delay relative to pulses of the first pulsed laser input, and
wherein the controller is configured to control the second pump laser source to provide the second pulsed laser input at the second state with a second pulse delay relative to pulses of the first pulsed laser input, wherein the first and second pulse delays are different.

17. The system according to claim 14, wherein the conversion material comprises a crystal.

18. The system according to claim 14, wherein the first laser input has a first wavelength, wherein the second laser input at the first state has a second wavelength, wherein the second laser input at the second state has the second wavelength, wherein the first laser output has a third wavelength, wherein the second laser output has the third wavelength, and where the third wavelength is a function of the first and second wavelengths.

19. The system according to claim 18, wherein the function is based on difference frequency generation (DFG).

20. The system according to claim 14, wherein the first pump laser source comprises a first fiber based pump laser source, and wherein the second pump laser source comprises a second fiber based pump laser source.

21. The system according to claim 14, wherein the conversion material is subject to a constant thermal load when generating the first and second laser outputs.

22. The system according to claim 14,
wherein the conversion material comprises a crystal,
wherein the controller is configured to provide a first control signal so that the second pump laser source generates the second laser input at the first state responsive to the first control signal,
wherein the controller is configured to provide a second control signal after providing the first control signal so that the second pump laser source generates the second laser input at the second state responsive to the second control signal,
wherein generating the first laser output comprises generating the first laser output based on conversion of the first laser input with the first average power and the second laser input at the first state with the second average power using the crystal to provide difference frequency generation (DPG),
wherein generating the second laser output comprises generating the second laser output based on conversion of the first laser input with the first average power and the second laser input at the second state with the second average power using the crystal to provide DFG.

* * * * *